(12) United States Patent
Kim et al.

(10) Patent No.: US 11,646,877 B2
(45) Date of Patent: May 9, 2023

(54) APPARATUS AND METHOD FOR GENERATING SECRET KEY, APPARATUS AND METHOD FOR GENERATING EVALUATION KEY

(71) Applicants: SAMSUNG SDS CO., LTD., Seoul (KR); SEOUL NATIONAL UNIVERSITY R&DB FOUNDATION, Seoul (KR)

(72) Inventors: Eunkyung Kim, Seoul (KR); Hyo Jin Yoon, Seoul (KR); Jung Hee Cheon, Seoul (KR); Jinhyuck Jeong, Seoul (KR)

(73) Assignees: SAMSUNG SDS CO., LTD., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 338 days.

(21) Appl. No.: 16/683,974

(22) Filed: Nov. 14, 2019

(65) Prior Publication Data
US 2020/0366467 A1    Nov. 19, 2020

Related U.S. Application Data

(60) Provisional application No. 62/847,455, filed on May 14, 2019.

(30) Foreign Application Priority Data

May 14, 2019    (KR) .................. 10-2019-0056601

(51) Int. Cl.
*H04L 9/08*    (2006.01)
*H04L 9/00*    (2022.01)

(52) U.S. Cl.
CPC .............. *H04L 9/085* (2013.01); *H04L 9/008* (2013.01); *H04L 9/0819* (2013.01); *H04L 9/0891* (2013.01)

(58) Field of Classification Search
CPC ...................................... H04L 9/085
See application file for complete search history.

(56) References Cited

U.S. PATENT DOCUMENTS 9,252,942 B2    2/2016    Zhang et al.
2003/0081789 A1*    5/2003    Numao .................. H04L 9/085
380/278

(Continued)

OTHER PUBLICATIONS

European Search Report for EP20167719.2 dated Sep. 10, 2020 from European patent office in a counterpart European patent application.

(Continued)

*Primary Examiner* — David J Pearson
(74) *Attorney, Agent, or Firm* — The PL Law Group, PLLC

(57) ABSTRACT

A method of generating a secret key according to one embodiment includes generating a share of each of a user and a plurality of other users for a secret key of the user, providing the share of each of the plurality of other users to a user terminal of each of the plurality of other users, receiving a share of the user for a secret key of each of the plurality of other users from the user terminal of each of the plurality of other users, and generating a new secret key of the user using the share of the user for the secret key of the user and the shares of the user for the secret key of each of the plurality of other users.

8 Claims, 7 Drawing Sheets

(56) References Cited

U.S. PATENT DOCUMENTS

| | | | |
|---|---|---|---|
| 2018/0101697 A1* | 4/2018 | Rane | G06F 21/602 |
| 2020/0082399 A1* | 3/2020 | Deshpande | H04L 9/085 |
| 2020/0213099 A1* | 7/2020 | Wright | H04L 9/0637 |
| 2020/0266974 A1* | 8/2020 | Cheon | H04L 9/0825 |
| 2020/0280430 A1* | 9/2020 | Tueno | H04L 9/008 |
| 2021/0075600 A1* | 3/2021 | Trevethan | H04L 9/3066 |

OTHER PUBLICATIONS

Gilad Asharov et al. "Multiparty Computation with Low Communication, Computation and Interaction via Threshold FHE". Annual International Conference on the Theory and Applications of Cryptographic Techniques. Eurocrypt 2018; [Lecture Notes in Computer Science; Lect. Notes Computer], Springer, Berlin, Heidelberg, pp. 483-501, XP019175411.

Office action dated Apr. 20, 2022 from European patent office in a counterpart European Patent Application No. 20167719.2.

Lean Harn et al. "Strong (n,t,n) verifiable secret sharing scheme" Information Sciences 180 (2010) 3059-3064.

\* cited by examiner

APPARATUS AND METHOD FOR GENERATING SECRET KEY, APPARATUS AND METHOD FOR GENERATING EVALUATION KEY

CROSS-REFERENCE TO RELATED APPLICATION(S)

This application claims the benefit of U.S. Provisional Patent Application No. 62/847,455 filed on May 14, 2019 and the benefit under 35 USC § 119(a) of Korean Patent Application No. 10-2019-0056601 filed on May 14, 2019, in the Korean Intellectual Property Office, the entire disclosures of which are incorporated herein by reference for all purposes.

BACKGROUND

1. Field

The following description relates to technology for encryption and decryption.

2. Description of Related Art

In prior arts including U.S. Pat. No. 9,252,942, one trusted user (a secret key manager) generates a public key and a secret key and distributes the public key to all users in order to provide a secure data fusion service among multiple users by using homomorphic encryption. In this case, the users encrypt their own data using the distributed public key and then perform a homomorphic evaluation of the encrypted data. Also, when the general users request the secret key manager for decryption, the secret key manager transmits a decrypted plaintext evaluation result to the general users.

In these prior arts, since the secret key is managed by the secret key manager, a problem arises in that the safety of the entire system depends entirely on the safety of the secret key manager. In other words, if the secret key is leaked through the secret key manager, data of all users can be recovered and the safety of the entire system is compromised. In addition, in the case of users who find it difficult to trust each other, it is impossible to set up a single secret key manager that all users can trust.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, there is provided a method of generating a secret key, which is performed by a computing device comprising one or more processors and a memory in which one or more programs to be executed by the one or more processors are stored, the method including generating a share of each of a user and a plurality of other users for a secret key of the user; providing the share of each of the plurality of other users to a user terminal of each of the plurality of other users; receiving a share of the user for a secret key of each of the plurality of other users from the user terminal of each of the plurality of other users; and generating a new secret key of the user using the share of the user for the secret key of the user and the shares of the user for the secret key of each of the plurality of other users.

The generating of the share may include generating the share of each of the user and the plurality of other users for the secret key of the user such that the secret key of the user is allowed to be generated using a predetermined number or more of shares among the shares of the user and the plurality of other users for the secret key of the user.

The method may further include generating a partial decryption result using the new secret key of the user with respect to a ciphertext encrypted using a common public key; receiving the partial decryption result with respect to the ciphertext generated using an updated secret key share of each of the predetermined number or more of other users from the user terminal of each of the predetermined number or more of other users among the plurality of other users; and generating a plaintext for the ciphertext using the generated partial decryption result and the received partial decryption result.

The common public key may be generated using a public key of the user which corresponds to the secret key of the user and a public key of each of the plurality of other users which corresponds to the secret key of each of the plurality of other users.

The generating of the plaintext may include generating the plaintext through linear combination between the generated partial decryption result and the received partial decryption result.

In another general aspect, there is provided an apparatus for generating a secret key including one or more processors; a memory; and one or more programs, wherein the one or more programs are stored in the memory and configured to be executed by the one or more processors and the one or more programs include commands for generating a share of each of a user and a plurality of other users for a secret key of the user, providing the share of each of the plurality of other users to a user terminal of each of the plurality of other users, receiving a share of the user for a secret key of each of the plurality of other users from the user terminal of each of the plurality of other users, and generating a new secret key of the user using the share of the user for the secret key of the user and the shares of the user for the secret key of each of the plurality of other users.

The generating of the share may include generating the share of each of the user and the plurality of other users for the secret key of the user such that the secret key of the user is allowed to be generated using a predetermined number or more of shares among the shares of the user and the plurality of other users for the secret key of the user.

The one or more programs may further include commands for generating a partial decryption result using the new secret key of the user with respect to a ciphertext encrypted using a common public key, receiving the partial decryption result with respect to the ciphertext generated using an updated secret key share of each of the predetermined number or more of other users from the user terminal of each of the predetermined number or more of other users among the plurality of other users, and generating a plaintext for the ciphertext using the generated partial decryption result and the received partial decryption result.

The common public key may be generated using a public key of the user which corresponds to the secret key of the user and a public key of each of the plurality of other users which corresponds to the secret key of each of the plurality of other users.

The generating of the plaintext may include generating the plaintext through linear combination between the generated partial decryption result and the received partial decryption result.

In still another general aspect, there is provided a method of generating an evaluation key, which is performed by a computing device comprising one or more processors and a memory in which one or more programs to be executed by the one or more processors are stored, the method including generating a ciphertext for a secret key of a user using a common public key; providing the ciphertext for the secret key of the user to each of user terminals of a plurality of other users; receiving a ciphertext for a secret key of each of the plurality of other users, which is encrypted using the common public key, from each of the user terminals of the plurality of other users; generating an evaluation key share of the user from the ciphertext for the secret key of the user and the ciphertext for the secret key of each of the plurality of other users using a homomorphic addition operation on the basis of the secret key of the user; receiving, from each of the plurality of other users, an evaluation key share of each of the plurality of other users, which is generated from the ciphertext for the secret key of the user and the ciphertext for the secret key of each of the plurality of other users, using a homomorphic addition operation on the basis of the secret key of each of the plurality of other users; and generating an evaluation key for a homomorphic multiplication operation for the ciphertext, which is encrypted using the common public key, by using the evaluation key share of the user and the evaluation key share of each of the plurality of other users.

The common public key may be generated using a public key of the user which corresponds to the secret key of the user and a public key of each of the plurality of other users which corresponds to the secret key of each of the plurality of other users.

The secret key of the user and the secret key of each of the plurality of other users may satisfy Equation 1 below:

$$sk_i=(1,s_i), i=1,2,\ldots,N \quad \text{[Equation 1]}$$

where $sk_i$ denotes a secret key of user i among N users including the user and the plurality of other users and $s_i$ denotes an element of a polynomial ring, and each of the ciphertext for the secret key of the user and the ciphertext for each of the plurality of other users may be a ciphertext obtained by encrypting $s_i$ using the common public key.

Each of the evaluation key share of the user and the evaluation key share of each of the plurality of other users is the same as a ciphertext obtained by encrypting $\Sigma_i^2 + \Sigma_{j\neq i} s_i s_j$ using the common public key.

The generating of the evaluation key may include generating the evaluation key by performing the homomorphic addition operation on the evaluation key share of the user and the evaluation key share of each of the plurality of other users and the evaluation key may be the same as a ciphertext obtained by encrypting $\Sigma_i s_i^2 + \Sigma_i \Sigma_{j\neq i} s_i s_j$ using the common public key.

In still another general aspect, there is provided an apparatus for generating an evaluation key including one or more processors; a memory; and one or more programs, wherein the one or more programs are stored in the memory and configured to be executed by the one or more processors and the one or more programs include commands for generating a ciphertext for a secret key of a user using a common public key, providing the ciphertext for the secret key of the user to each of user terminals of a plurality of other users, receiving a ciphertext for a secret key of each of the plurality of other users, which is encrypted using the common public key, from each of the user terminals of the plurality of other users, generating an evaluation key share of the user from the ciphertext for the secret key of the user and the ciphertext for the secret key of each of the plurality of other users using a homomorphic addition operation on the basis of the secret key of the user, receiving, from each of the plurality of other users, an evaluation key share of each of the plurality of other users, which is generated from the ciphertext for the secret key of the user and the ciphertext for the secret key of each of the plurality of other users, using a homomorphic addition operation on the basis of the secret key of each of the plurality of other users, and generating an evaluation key for a homomorphic multiplication operation for the ciphertext, which is encrypted using the common public key, by using the evaluation key share of the user and the evaluation key share of each of the plurality of other users.

The common public key may be generated using a public key of the user which corresponds to the secret key of the user and a public key of each of the plurality of other users which corresponds to the secret key of each of the plurality of other users.

The secret key of the user and the secret key of each of the plurality of other users may satisfy Equation 1 below:

$$sk_i=(1,s_i), i=1,2,\ldots,N \quad \text{[Equation 1]}$$

where $sk_i$ denotes a secret key of user i among N users including the user and the plurality of other users and $s_i$ denotes an element of a polynomial ring, and each of the ciphertext for the secret key of the user and the ciphertext for each of the plurality of other users is a ciphertext obtained by encrypting $s_i$ using the common public key.

Each of the evaluation key share of the user and the evaluation key share of each of the plurality of other users may be the same as a ciphertext obtained by encrypting $s_i^2 + \Sigma_{j\neq i} s_i s_j$ using the common public key.

The generating of the evaluation key may include generating the evaluation key by performing the homomorphic addition operation on the evaluation key share of the user and the evaluation key share of each of the plurality of other users and the evaluation key may be the same as a ciphertext obtained by encrypting $\Sigma_i s_i^2 + \Sigma_i \Sigma_{j\neq i} s_i s_j$ using the common public key.

In another general aspect, there is provided a method of generating an evaluation key, which is performed by a computing device comprising one or more processors and a memory in which one or more programs to be executed by the one or more processors are stored, the method including generating a ciphertext for a secret key of a user using a public key of the user; providing the ciphertext for the secret key of the user to a user terminal of each of a plurality of other users; receiving, from the user terminal of each of the plurality of other users, a ciphertext for a secret key of each of the plurality of other users, which is encrypted using a public key of each of the plurality of other users; generating an intermediate evaluation key using the ciphertext for the secret key of the user and the ciphertext for the secret key of each of the plurality of other users; generating an evaluation key share of the user using the secret key of the user and the intermediate evaluation key; receiving, from each of the plurality of other users, an evaluation key share of each of the plurality of other users, which is generated using the secret key of each of the plurality of other users and the intermediate evaluation key; and generating an evaluation key for a homomorphic multiplication operation for a ciphertext, which is encrypted using a common public key, by using the evaluation key share of the user and the evaluation key share of each of the plurality of other users.

the common public key may be generated using the public key of the user and the public key of each of the plurality of other users.

The secret key of the user and the secret key of each of the plurality of other users satisfy Equation 1 below:

$$sk_i=(1,s_i), i=1,2,\ldots,N \qquad \text{[Equation 1]}$$

where $sk_i$ denotes a secret key of user i among N users including the user and the plurality of other users and $s_i$ denotes an element of a polynomial ring, and each of the ciphertext for the secret key of the user and the ciphertext for each of the plurality of other users may be a ciphertext obtained by encrypting $s_1$.

The generating of the intermediate evaluation key may include generating the intermediate evaluation key by performing a homomorphic addition operation between the ciphertext for the secret key of the user and the ciphertext for the secret key of each of the plurality of other users and the intermediate evaluation key may be the same as a ciphertext obtained by encrypting $\Sigma_{i=1}^{N} s_i$ using the common public key.

Each of the evaluation key share of the user and the evaluation key share of each of the plurality of other users may be the same as a ciphertext obtained by encrypting $s_i^2 + \Sigma_{j \neq i} s_i s_j$ using the common public key.

The generating of the evaluation key may include generating the evaluation key by performing the homomorphic addition operation on the evaluation key share of the user and the evaluation key share of each of the plurality of other users and the evaluation key is the same as a ciphertext obtained by encrypting $\Sigma_i s_i^2 + \Sigma_i \Sigma_{j \neq i} s_i s_j$ using the common public key.

In another general aspect, there is provided an apparatus for generating an evaluation key including one or more processors; a memory; and one or more programs, wherein the one or more programs are stored in the memory and configured to be executed by the one or more processors and the one or more programs include commands for generating a ciphertext for a secret key of a user using a public key of the user, providing the ciphertext for the secret key of the user to a user terminal of each of a plurality of other users, receiving, from the user terminal of each of the plurality of other users, a ciphertext for a secret key of each of the plurality of other users, which is encrypted using a public key of each of the plurality of other users, generating an intermediate evaluation key using the ciphertext for the secret key of the user and the ciphertext for the secret key of each of the plurality of other users, generating an evaluation key share of the user using the secret key of the user and the intermediate evaluation key, receiving, from each of the plurality of other users, an evaluation key share of each of the plurality of other users, which is generated using the secret key of each of the plurality of other users and the intermediate evaluation key, and generating an evaluation key for a homomorphic multiplication operation for a ciphertext, which is encrypted using a common public key, by using the evaluation key share of the user and the evaluation key share of each of the plurality of other users.

The common public key may be generated using the public key of the user and the public key of each of the plurality of other users.

The secret key of the user and the secret key of each of the plurality of other users may satisfy Equation 1 below:

$$sk_i=(1,s_i), i=1,2,\ldots,N \qquad \text{[Equation 1]}$$

where $sk_i$ denotes a secret key of user i among N users including the user and the plurality of other users and $s_i$ denotes an element of a polynomial ring, and each of the ciphertext for the secret key of the user and the ciphertext for each of the plurality of other users may be a ciphertext obtained by encrypting $s_1$.

The generating of the intermediate evaluation key may include generating the intermediate evaluation key by performing a homomorphic addition operation between the ciphertext for the secret key of the user and the ciphertext for the secret key of each of the plurality of other users and the intermediate evaluation key may be the same as a ciphertext obtained by encrypting $\Sigma_{i=1}^{N} s_i$ using the common public key.

Each of the evaluation key share of the user and the evaluation key share of each of the plurality of other users may be the same as a ciphertext obtained by encrypting $s_i^2 + \Sigma_{j \neq i} s_i s_j$ using the common public key.

The generating of the evaluation key may include generating the evaluation key by performing the homomorphic addition operation on the evaluation key share of the user and the evaluation key share of each of the plurality of other users and the evaluation key is the same as a ciphertext obtained by encrypting $\Sigma_i s_i^2 + \Sigma_i \Sigma_{j \neq i} s_i s_j$ using the common public key.

Other features and aspects will be apparent from the following detailed description, the drawings, and the claims.

Figure 1:
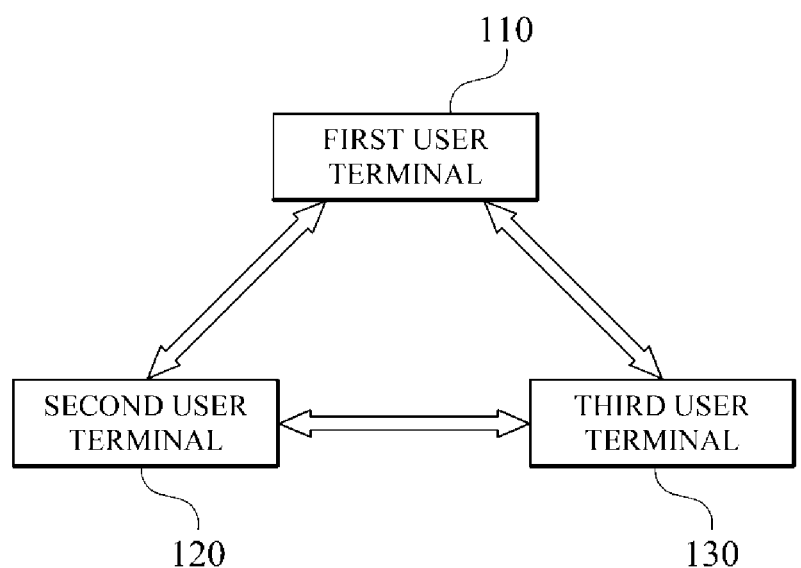
FIG. 1 is a diagram illustrating a configuration of an encryption system according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a diagram illustrating a configuration of an encryption system according to one embodiment of the present disclosure.

Referring to FIG. 1, the encryption system 100 according to one embodiment of the present disclosure includes a plurality of user terminals 110, 120, and 130.

Each of the plurality of user terminals 110, 120, and 130 is a terminal used by a different user and may be, for example, a desktop personal computer (PC), a laptop PC, a smartphone, a phablet, or the like, but is not limited to a specific type of device as long as the device has a communication function and a data operation function using a wired/wireless network.

Hereinafter, it is assumed, for convenience of description, that there are three user terminals 110, 120, and 130 included in the encryption system 100 as illustrated in FIG. 1, but the number of user terminals 110, 120, and 130 may be two or four or more, unlike the example shown in FIG. 1.

In addition, hereafter, it is assumed that a first user terminal 110 is used by user 1, a second user terminal 120 is used by user 2, and a third user terminal 130 is used by user 3.

Meanwhile, the encryption system 100 may perform generation of a common public key for a plurality of users, encryption using the common public key, and distributed decryption for a ciphertext encrypted using the common public key, on the basis of homomorphic encryption including the following four algorithms.

Key generation algorithm (KeyGen): A key generation algorithm generates a public key used for encryption, an evaluation key for homomorphic evaluation, and a secret key used for decryption for a ciphertext encrypted using the public key.

Encryption algorithm (Enc): An Encryption algorithm generates a ciphertext for a plaintext using the public key.

Decryption algorithm (Dec): A decryption algorithm uses a secret key to decrypt a ciphertext encrypted using a public key.

Homomorphic evaluation algorithm (Eval): A homomorphic evaluation algorithm generates a ciphertext for evaluation results of plaintexts for each of a plurality ciphertexts by computing the plurality of ciphertexts, which are encrypted using the same public key, in an encrypted state. For example, the homomorphic evaluation algorithm may include a homomorphic addition algorithm in which ciphertext C of m and ciphertext C' of m', each of which is encrypted using a public key, are computed in an encrypted state so as to generate ciphertext $C^+$ of m+m' and a homomorphic multiplication algorithm in which ciphertext C of m and ciphertext C' of m' are computed in an encrypted state to generate ciphertext C* of m*m'. Meanwhile, in the embodiment of the present disclosure, homomorphic encryption used in the encryption system 100 is not necessarily limited to a specific type of homomorphic encryption as long as the following two conditions are satisfied.

Condition (1): As shown in Equation 1 below, evaluation '$+_{pk}$' between public keys and evaluation '$+_{sk}$' between secret keys which can generate new valid public key-secret key pair ($pk_{new}$, $sk_{new}$) from n (here, n is an integer greater than or equal to 2) public key-secret key pairs ($pk_1$, $sk_1$), . . . , and ($pk_n$, $sk_n$) may be defined.

$$(pk_{new}, sk_{new}) = (pk_1 +_{pk} \ldots +_{pk} pk_n, sk_1 +_{sk} \ldots +_{sk} sk_n) \quad \text{[Equation 1]}$$

Condition (2): Equation 2 below is established for a ciphertext C encrypted through an encryption algorithm using a new public key $pk_{new}$.

$$Dec(sk_{new}, C) = Dec(sk_1, C) + \ldots + Dec(sk_n, C) \quad \text{[Equation 2]}$$

Here, Dec(sk,C) denotes a result of decrypting a ciphertext C through a decryption algorithm using a secret key sk.

Figure 2:
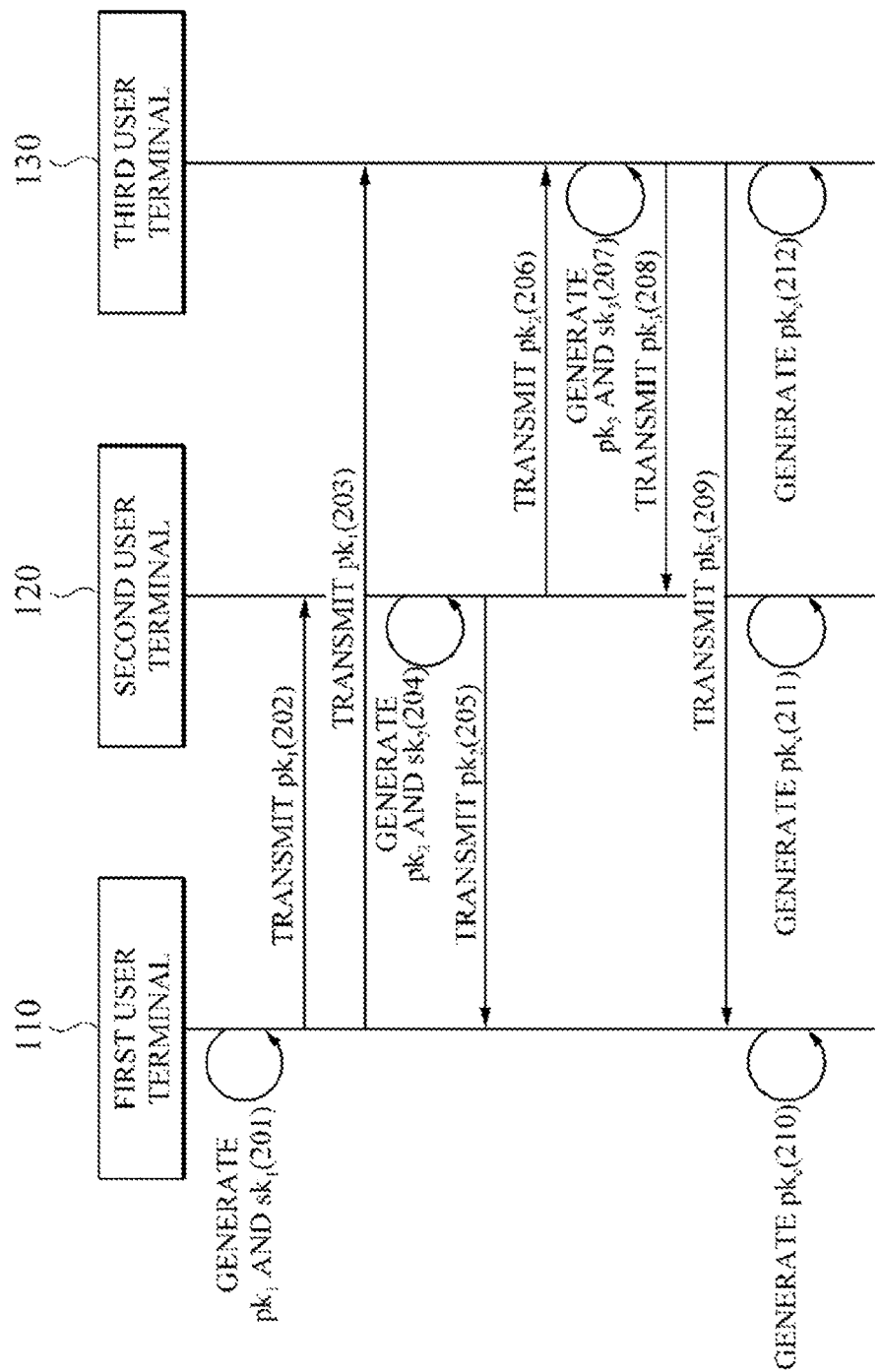
FIG. 2 is a flowchart illustrating a process of generating a common public key according to one embodiment of the present disclosure.

FIG. 2 is a flowchart illustrating a process of generating a common public key according to one embodiment of the present disclosure.

Referring to FIG. 2, a first user terminal 110 generates a public key $pk_1$ and a secret key $sk_1$ of user 1 (201) and provides the generated public key $pk_1$ to a second user terminal 120 and a third user terminal 130 (202 and 203).

In this case, the first user terminal 110 may generate the public key $pk_1$ and the secret key $sk_1$ using a key generation algorithm of homomorphic encryption.

The second user terminal 120 generates a public key $pk_2$ and a secret key $sk_2$ of user 2 (204) and provides the generated public key pk2 to the first user terminal 110 and the third user terminal 130 (205 and 206).

In this case, the second user terminal 120 may generate the public key $pk_2$ and the secret key $sk_2$ using a key generation algorithm of homomorphic encryption.

The third user terminal 130 generates a public key $pk_3$ and a secret key $sk_3$ of user 3 (207) and provides the generated public key $pk_3$ to the first user terminal 110 and the second user terminal 120 (208 and 209).

In this case, the third user terminal 130 may generate the public key $pk_3$ and the secret key $sk_3$ using a key generation algorithm of homomorphic encryption.

Then, the first user terminal 110, the second user terminal 120, and the third user terminal 130 generate a common public key $pk_c$ using $pk_1$, $pk_2$, and $pk_3$, respectively (210, 211, and 212).

In this case, the common public key $pk_c$ may be generated using Equation 3 below.

$$pk_c = pk_1 +_{pk} \ldots +_{pk} pk_N \quad \text{[Equation 3]}$$

In Equation 3, N denotes the number of users involved in generating a common public key $pk_c$ (hereinafter, N will be used in the same sense), and N=3 in the example illustrated in FIG. 2.

Meanwhile, a common secret key $sk_c$ capable of decrypting a ciphertext encrypted through an encryption algorithm of homomorphic encryption using the common public key $pk_c$ may be defined as Equation 4 below.

$$sk_c = sk_1 +_{sk} \ldots +_{sk} sk_N \quad \text{[Equation 4]}$$

However, according to the embodiment of the present disclosure, it is possible to generate a plaintext for a ciphertext encrypted using the common public key $pk_c$, without using the common secret key $sk_c$, through distributed decryption as described below, and thus, unlike the common public key $pk_c$, none of the user terminals 110, 120, and 130 generate the common secret key $sk_c$.

Figure 3:
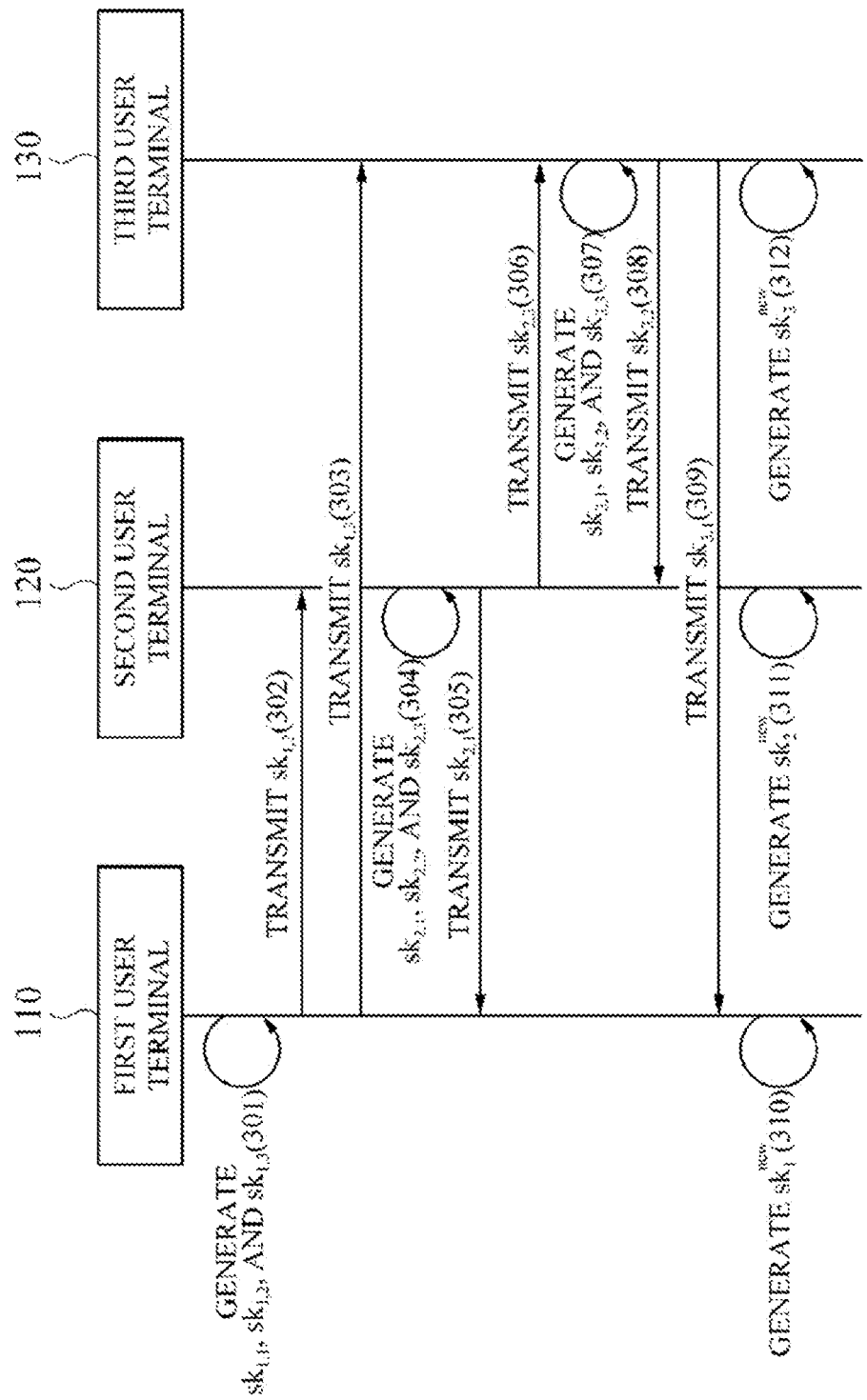
FIG. 3 is a flowchart illustrating a process of generating a secret key of a user for distributed decryption according to one embodiment of the present disclosure.

FIG. 3 is a flowchart illustrating a process of generating a secret key of a user for distributed decryption according to one embodiment of the present disclosure.

Procedures illustrated in FIG. 3 may be performed after the common public key $pk_c$ in accordance with FIG. 2 is generated.

Referring to FIG. 3, the first user terminal 110 generates a share $sk_{1,1}$ of user 1, a share $sk_{1,2}$ of user 2, and a share $sk_{1,3}$ of user 3 with respect to the secret key $sk_1$ of user 1 (301).

Hereinafter, the first user terminal 110 provides $sk_{1,2}$ to the second user terminal 120 (302) and provides $sk_{1,3}$ to the third user terminal 130 (303).

The second user terminal 120 generates a share $sk_{2,1}$ of user 1, a share $sk_{2,2}$ of user 2, and a share $sk_{2,3}$ of user 3 with respect to the secret key $sk_2$ of user 2 (304).

Then, the second user terminal 120 provides $sk_{2,1}$ to the first user terminal 110 (305) and provides $sk_{2,3}$ to the third user terminal 130 (306).

The third user terminal 130 generates a share $sk_{3,1}$ of user 1, a share $sk_{3,2}$ of user 2, and a share $sk_{3,3}$ of user 3 with respect to the secret key $sk_3$ of user 3 (307).

Then, the third user terminal 130 provides $sk_{3,2}$ to the second user terminal 120 (308) and provides $sk_{3,1}$ to the first user terminal (309).

Thereafter, the first user terminal 110 generates a new secret key $sk_1^{new}$ of user 1 using the shares $sk_{1,1}$, $sk_{2,1}$, and $sk_{3,1}$ of user 1 for the secret key $sk_1$ of user 1, the secret key $sk_2$ of user 2, and the secret key sk3 of user 3, respectively (310).

In addition, the second user terminal 120 generates a new secret key $sk_2^{new}$ of user 2 using the shares $sk_{1,2}$, $sk_{2,2}$, and $sk_{3,2}$ of user 2 for the secret key $sk_1$ of user 1, the secret key $sk_2$ of user 2, and the secret key sk3 of user 3, respectively (311).

Also, the third user terminal 130 generates a new secret key $sk_3^{new}$ of user 3 using the shares $sk_{1,3}$, $sk_{2,3}$, and $sk_{3,3}$ of user 3 for the secret key $sk_1$ of user 1, the secret key $sk_2$ of user 2, and the secret key sk3 of user 3, respectively (312).

According to one embodiment, in operations 301, 304, and 307 of FIG. 3, each of the user terminals 110, 120, and 130 may generate $sk_0$, $sk_{1,2}$, and $sk_{1,3}$ such that a secret key $sk_i$ of user i can be generated using a predetermined number or more of shares among shares $sk_{i,1}$, $sk_{i,2}$, and $sk_{i,3}$ for the secret key $sk_i$ of user i (here, i=1, 2, . . . , N) of each of the user terminals 110, 120, and 130.

Specifically, the secret key $sk_i$ of user i among N users involved in generating a common public key $pk_c$ may be generated using t shares (here, t is an integer and $1<t\leq N$) among shares $sk_{i,1}$, $sk_{i,2}$, . . . , and $sk_{i,N}$ of each of the N users, as shown in Equation 5 below.

$$sk_i = a_{i,1} +_{sk} \ldots +_{sk} a_t sk_{i,t}$$ [Equation 5]

In Equation 5, each of the coefficients $a_1$, . . . , $a_N$ multiplied to a share of each of the users for a secret key $sk_i$ may be a fixed value predetermined for each user.

To this end, each of the user terminals 110, 120, and 130 may generate shares $sk_{i,1}$, $sk_{i,2}$, and $sk_{i,3}$ for the secret key $sk_i$ of user i using Shamir's secret sharing which uses the secret key $sk_i$ of user i as secret information.

According to one embodiment of the present disclosure, in operations 310 to 312, each of the users 110, 120, and 130 may generate a new secret key $sk_i^{new}$ of user i using Equation 6 below.

$$sk_i^{new} = sk_{1,i} +_{sk} \ldots +_{sk} sk_{N,i}$$ [Equation 6]

Meanwhile, according to Equations 4 to 6 described above, the common secret key $sk_c$ may satisfy such a relation as Equation 7.

$$\begin{aligned}a_1 sk_1^{new} +_{sk} \cdots +_{sk} a_t sk_t^{new} &= a_1(sk_{1,1} +_{sk} \cdots +_{sk} sk_{N,1}) +_{sk} \cdots \\ &\quad +_{sk} a_t(sk_{1,t} +_{sk} \cdots +_{sk} sk_{N,t}) \\ &= (a_1 sk_{1,1} +_{sk} \cdots \\ &\quad +_{sk} a_t sk_{1,t}) +_{sk} \cdots \\ &\quad +_{sk} (a_1 sk_{N,1} +_{sk} \cdots \\ &\quad +_{sk} a_t sk_{N,t}) \\ &= sk_1 +_{sk} \cdots +_{sk} sk_N = sk_c\end{aligned}$$ [Equation 7]

Figure 4:
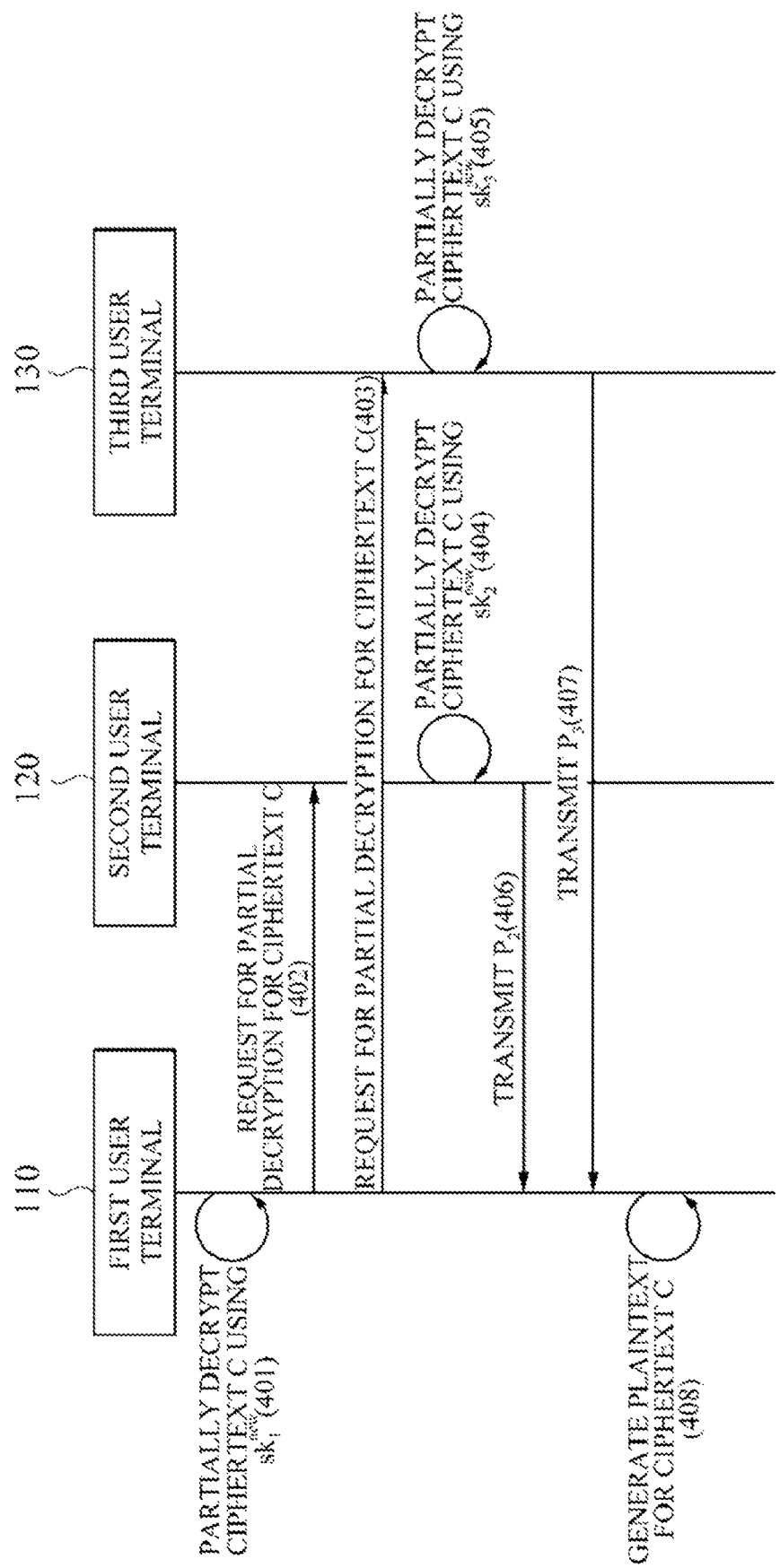
FIG. 4 is a flowchart illustrating a process of distributed description according to one embodiment of the present disclosure.

FIG. 4 is a flowchart illustrating a process of distributed description according to one embodiment of the present disclosure.

Referring to FIG. 4, the first user terminal 110 generates a result $p_1=Dec(sk_1^{new}, C)$ of partially decrypting a ciphertext C for a plaintext m, which is encrypted using the common public key $pk_c$, by using $sk_1^{new}$, (401).

Then, the first user terminal 110 request the second user terminal 120 and the third user terminal 130 to partially decrypt the ciphertext C (402 and 403).

Then, the second user terminal 120 generates a result $p_2=Dec(sk_2^{new}, C)$ of partially decrypting the ciphertext C using $sk_2^{new}$ (404) and the third user terminal 130 generates a result $p_3=Dec(sk_3^{new}, C)$ of partially decrypting the ciphertext C using $sk_3^{new}$ (405).

Meanwhile, in each of operations 410, 404, and 405, the partial decryption may be performed through an encryption algorithm of homomorphic encryption using $sk_i^{new}$ as a decryption key.

Then, the second user terminal 120 and the third user terminal 130 each provide the generated partial decryption result $p_2$ and $p_3$ to the first user terminal 110 (406 and 407).

Then, the first user terminal 110 generates a plaintext m for the ciphertext C using $p_1$, $p_2$, and $p_3$ (408). In this case, the first user terminal 110 may generate the plaintext m for the ciphertext C through linear combination of $p_1$, $p_2$, and $p_3$ as shown in Equation 8 below.

$$m = a_1 p_1 + \ldots + a_t p_t = a_1 Dec(sk_1^{new}, C) + \ldots + a_t Dec(sk_t^{new}, C)$$ [Equation 8]

According to Equations 2 and 7 described above, Equation 8 may satisfy such a relation as Equation 9 below.

$$\begin{aligned}a_1 p_1 + \cdots + a_t p_t &= a_1 Dec(sk_1^{new}, C) + \cdots \\ &\quad + a_t Dec(sk_t^{new}, C) \\ &= Dec(a_1 sk_1^{new} +_{sk} \cdots \\ &\quad +_{sk} a_t sk_t^{new}, C) = \\ &\quad Dec(sk, C) = m\end{aligned}$$ [Equation 9]

Therefore, it is possible to decrypt the ciphertext C without generating a common public key $sk_c$ for decrypting the ciphertext C.

Hereinafter, detailed embodiments using illustrative homomorphic encryption will be described.

Specifically, illustrative homomorphic encryption may consist of the following four algorithms.

Key generation algorithm (KeyGen): A key generation algorithm generates a public key pk, a secret key sk, an evaluation key evk for a homomorphic multiplication operation using Equations 10 to 12, respectively.

$$sk=(1,s)\in R^2 \qquad \text{[Equation 10]}$$

$$pk=(b,a)=(-as+e,a)\in R_q^2 \qquad \text{[Equation 11]}$$

$$evk=(b',a')=(-a's+e'+s^2,a')\in R_{Pq}^2 \qquad \text{[Equation 12]}$$

Here, R denotes a polynomial ring in which $R=Z[X]/(X^N+1)$, $R_q$ denotes a quotient ring in which $R_q=R/qR$ (here, q is an arbitrary integer), s and a are arbitrary elements of R, e denotes a very small error value, which is an element of R, a' denotes an arbitrary element of $R_{Pq}$, and P denotes a sufficiently large integer.

Encryption algorithm (Enc): An encryption algorithm generates a ciphertext C for a plaintext m that is an element of R using Equation 13 below.

$$C=\text{Enc}(pk,m)=(C_0,C_1)=v(b,a)+(m+e_0,e_1)+(vb+m+e_0,va+e_1) \qquad \text{[Equation 13]}$$

Here, v denotes a very small arbitrary element of R, and $e_0$ and $e_1$ denote very small error values, which are elements of R.

Decryption algorithm (Dec): A decryption algorithm generates a plaintext m for a ciphertext C using a dot product of the ciphertext C and a secret key sk, as shown in Equation 14 below.

$$p=\text{Dec}(sk,C)=C_0+C_1s=m+e \in R_q \qquad \text{[Equation 14]}$$

Here, if an error value e is sufficiently small compared to the plain text m, then p may be considered an approximate of m.

Homomorphic evaluation algorithm (Eval): A homomorphic evaluation algorithm supports a homomorphic addition operation in which ciphertext C of m and ciphertext C' of m', each of which is encrypted using a public key pk, are computed in an encrypted state so as to generate ciphertext $C^+$ of m+m' and a homomorphic multiplication operation in which ciphertext C of m and ciphertext C' of m' are computed in an encrypted state to generate ciphertext $C^*$ of m*m'. Here, the homomorphic addition operation does not require an evaluation key evk, unlike the homomorphic multiplication operation.

Meanwhile, if it is defined that $pk+_{pk}pk'=(b+b',a)$, $sk+_{sk}sk'=(1,s+s')$ for two public key-secret key pairs (pk=(b,a), sk=(1,s)) and (pk'=(b',a), sk=(1,s')) generated using the above-described illustrative key generation algorithm of homomorphic encryption, the above illustrative homomorphic encryption satisfies the above-described conditions (1) and (2).

Therefore, the encryption system 100 may perform the procedures in accordance with FIGS. 2 to 4 using the above-described illustrative homomorphic encryption.

Specifically, in operations 201, 205, and 207 in the flowchart shown in FIG. 2, each of the user terminals 110, 120, and 130 may generate a public key $pk_i=(b_i,a)$ and a secret key $sk_i=(1,s_i)$ of user i of each of the user terminals 110, 120, and 130 using the key generation algorithm of the illustrative homomorphic encryption described above.

Also, in operations 210, 211, and 212, each of the user terminals 110, 120, and 130 may generate a common public key $pk_c$ using Equation 15 below.

$$pk_c=pk_1+_{pk}\ldots+_{pk}pk_N=(b_1+\ldots+b_N,a)=(b,a) \qquad \text{[Equation 15]}$$

Meanwhile, a common secret key $sk_c$ corresponding to the common public key $pk_c$ that satisfies Equation 15 may be defined as below.

$$sk_c=sk_1+_{sk}\ldots+_{sk}sk_N=(1,s_1+\ldots+s_N)=(1,s) \qquad \text{[Equation 16]}$$

In addition, referring to Equations 10 to 13, an evaluation key for a homomorphic multiplication operation for a ciphertext encrypted using the common public key $pk_c$ that satisfies Equation 15 may have the same form as a ciphertext of $s^2=(s_1+\ldots+s_N)^2=\Sigma_i s_i^2+\Sigma_i\Sigma_{j\neq i}s_is_j$.

Figure 5:
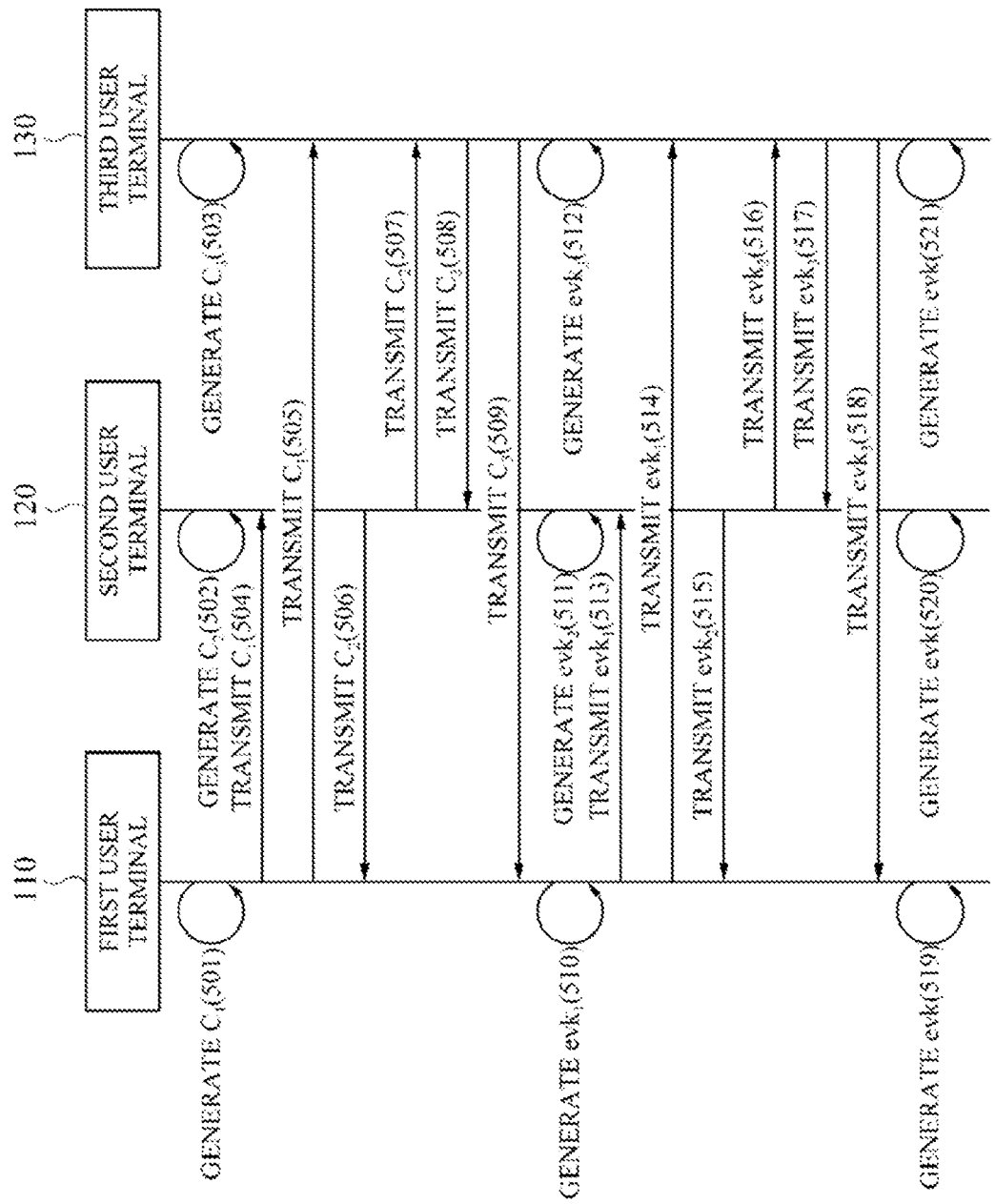
FIG. 5 is a flowchart illustrating a process of generating an evaluation key according to one embodiment of the present disclosure.
Figure 6:
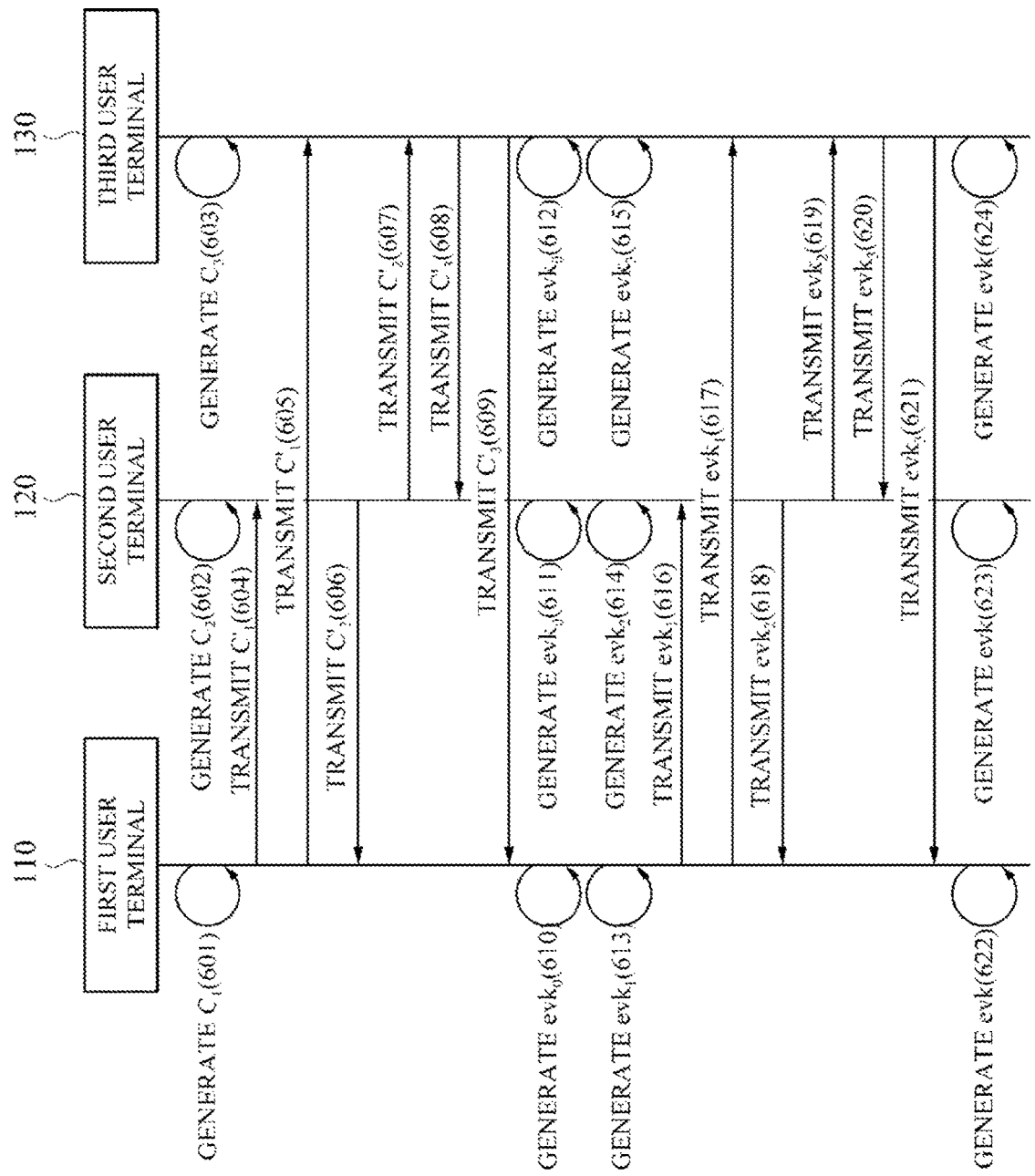
FIG. 6 is a flowchart illustrating a process of generating an evaluation key according to another embodiment of the present disclosure.

Thus, according to one embodiment of the present disclosure, each of the user terminals 110, 120, and 130 of the encryption system 100 may generate an evaluation key evk through evaluation key generation procedures shown in FIG. 5 or 6.

The evaluation key generation procedures shown in FIG. 5 may be performed after the common public key $pk_c$ in accordance with FIG. 2 is generated.

Referring to FIG. 5, first, each of the user terminals 110, 120, and 130 generates a ciphertext $C_i$ for a secret key $sk_i$ of the user of each of the user terminals 110, 120, and 130 using the common public key $pk_c$ (501, 502, and 503).

Here, the ciphertext $C_i$ may be a ciphertext obtained by encrypting $s_i$ with the common public key $pk_c$ on the basis of the secret key $sk_i=(1,s_i)$ of the user of each of the user terminals 110, 120, and 130.

Then, each of the user terminals 110, 120, and 130 provides the generated ciphertext $C_i$ to the other user terminals (504 to 509).

Thereafter, each of the user terminals 110, 120, and 130 may generate an evaluation key share $evk_i$ of the user from the ciphertext $C_i$ and a ciphertext $C_j$ (here, j≠i) using a homomorphic addition operation on the basis of the secret key $sk_i$ of the user of each of the user terminals 110, 120, and 130 (510, 511, and 512).

In this case, the evaluation key share $evk_i$ of the user may be the same as a ciphertext (i.e., $s_i^2+\Sigma_{j\neq i}s_is_j$) obtained by encrypting $s_i^2+\Sigma_{j\neq i}s_is_j$ using the common public key plcv.

Specifically, each of the user terminals 110, 120, and 130 may repetitively perform the homomorphic addition operation for the cipher text Ci to generate a ciphertext for $s_i^2$ and may repetitively perform the homomorphic addition operation for the ciphertext $C_j$ to generate a ciphertext for $\Sigma_{j\neq i}s_is_j$. Also, each of the user terminals 110, 120, and 130 may perform the homomorphic addition operation between the ciphertext for $s_i^2$ and the ciphertext for $\Sigma_{j\neq i}s_is_j$ to generate a ciphertext for $s_i^2+\Sigma_{j\neq i}s_is_j$.

Then, each of the user terminals 110, 120, and 130 provides the evaluation key share $evk_i$ of the user to the other user terminals (513 to 518).

Thereafter, each of the user terminals 110, 120, and 130 uses the evaluation key share $evk_i$ of the user, which is generated by the user terminal itself, and the evaluation key shares $evk_j$ of the other users received from the other user terminals to generate an evaluation key evk for a homomorphic multiplication operation for the ciphertext encrypted using the common public key $pk_c$ (519, 520, and 521).

Specifically, each of the user terminals 110, 120, and 130 may generate the evaluation key evk through the homomorphic addition operation between the evaluation key share $evk_i$ of the user, which is generated by the user terminal itself, and the evaluation key shares $evk_j$ of the other users received from the other user terminals. Here, the evaluation key evk may be the same as a ciphertext obtained by encrypting $\Sigma_i s_i^2+\Sigma_i\Sigma_{j\neq i}s_is_j$ with the common public key $pk_c$.

Meanwhile, the evaluation key generation procedures shown in FIG. 6 may be performed after the public key $pk_i$ and the secret key $sk_i$ of the user for generating the common public key $pk_c$ in accordance with FIG. 2 are generated.

Referring to FIG. 6, first, each of the user terminals 110, 120, and 130 generates a ciphertext $C'_i$ for the secret key $sk_i$ of the user using the public key $pk_i$ of the user (601, 602, and 603).

Here, the ciphertext $C'_i$ may be a ciphertext obtained by encrypting $s_i$ using the public key $pk_i$ of the user on the basis of the secret key $sk_i=(1,s_i)$ of the user of each of the user terminals 110, 120, and 130 and the public key $pk_i=(b_i, a)=(-a \cdot s_i+e_i, a)$ of the user. That is, according to the above Equation 13, the ciphertext $C'_i$ may satisfy Equation 17 below.

$$C'_i=(v \cdot b_i+s_i+e_0, v \cdot a+e_1)=(-a' \cdot s_i+e_i'+s_i, a') \quad \text{[Equation 17]}$$

Then, each of the user terminals 110, 120, and 130 provides the generated ciphertext $C'_i$ to the other user terminals (604 to 609).

Then, each of the user terminals 110, 120, and 130 generates an intermediate evaluation key $evk_0$ using ciphertexts $C'_i$ and $C'_j$ (here, $j \neq i$) (610, 611, and 612).

In this case, each of the user terminals 110, 120, and 130 may perform a homomorphic addition operation between the ciphertexts $C'_i$ and $C'_j$ to generate the intermediate evaluation key $evk_0$. Specifically, when the ciphertexts $C'_i$ and $C'_j$ each satisfy the above Equation 17, the homomorphic addition operation may be performed through an addition operation between the ciphertexts, and as a result, the intermediate evaluation key $evk_0$ becomes the same as a ciphertext obtained by encrypting s (i.e., $\Sigma_{i=1}^{N} s_i$) in the common secret key $sk_c=(1,s)$ using the common public key $pk_c=(b, a)=(-a \cdot s+e, a)$ as shown in Equation 18 below.

$$evk_0 = \sum_{i=1}^{N} C'_i = \left(-a' \cdot \sum_{i=1}^{N} s_i + \sum_{i=1}^{N} e'_i + \sum_{i=1}^{N} s_i, a'\right) = (-a' \cdot s + e + s, a') \quad \text{[Equation 18]}$$

Then, each of the user terminals 110, 120, and 130 generates an evaluation key share $evk_i$ of the user using the secret key $sk_i$ and the intermediate evaluation key $evk_0$ of the user of each of the user terminals 110, 120, and 130 (613, 614, and 615).

Here, the evaluation key share $evk_i$ of user i may be the same as a ciphertext obtained by encrypting $s_i^2+s_i\Sigma_{j \neq i}s_j$ with the common public key $pk_c$ and may be generated by multiplying the intermediate evaluation key $evk_0$ by $s_i$.

Then, each of the user terminals 110, 120, and 130 provides the evaluation key share $evk_i$ to the other user terminals (616 to 621).

Then, each of the user terminals 110, 120, and 130 uses the evaluation key share of the user, which is generated by the user terminal itself, and the evaluation key shares $evk_j$ of the other users received from the other user terminals to generate an evaluation key evk for a homomorphic multiplication operation for a ciphertext encrypted using the common public key $pk_c$ (622, 623, and 624).

Specifically, each of the user terminals 110, 120, and 130 may generate the evaluation key evk through a homomorphic addition operation between the evaluation key share $evk_i$ of the user, which is generated by the user terminal itself, and the evaluation key shares $evk_j$ of the other users received from the other user terminals. Here, the evaluation key evk may be the same as a ciphertext obtained by encrypting $\Sigma_i s_i^2+\Sigma_i\Sigma_{j \neq i}s_is_j$ with the common public key plcv.

Meanwhile, in the flowcharts illustrated in FIGS. 2 to 6, the above decryption process is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 7:
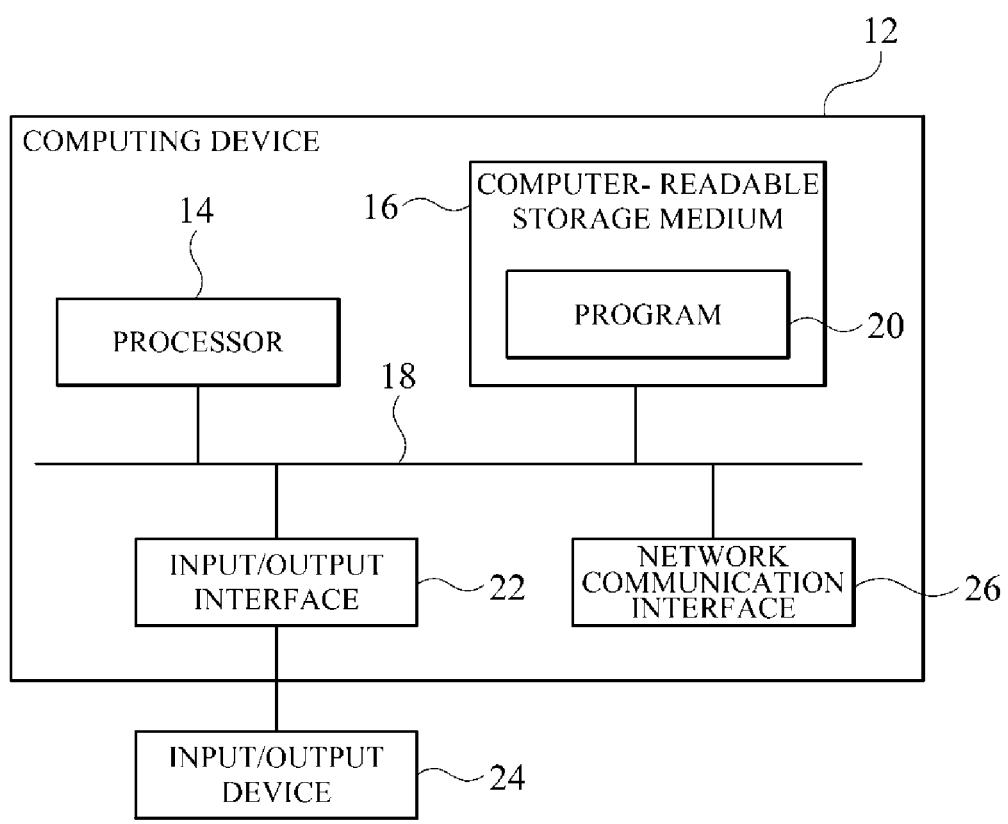
FIG. 7 is a block diagram for describing a computing environment including a computing device suitable to be used in exemplary embodiments.

FIG. 7 is a block diagram for describing a computing environment including a computing device suitable to be used in exemplary embodiments. In the illustrated embodiments, each of the components may have functions and capabilities different from those described hereinafter and additional components may be included in addition to the components described herein.

The illustrated computing environment 10 includes a computing device 12. In one embodiment, the computing device 12 may be one or more components included in each of the user terminals 110, 120, and 130.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the exemplary embodiment.

The computer readable storage medium 16 is configured to store computer executable commands and program codes, program data and/or information in other suitable forms. The program 20 stored in the computer readable storage medium 16 may include a set of commands executable by the processor 14. In one embodiment, the computer readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

According to the embodiments of the present disclosure, management authority for a common secret key that corresponds to a common public key is distributed to all users who have cooperated in generating the common public key and decryption for a ciphertext encrypted using the common public key is allowed only when the minimum number of users who have cooperated in generating the common public key agree, so that unauthorized data leakage due to leakage of the common secret key can be prevented and safe management of the secret key is enabled among users who lack mutual trust.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a secret key, which is performed by a computing device comprising one or more processors and a memory in which one or more programs to be executed by the one or more processors are stored, the method comprising:
   generating a pair of a public key and a secret key of a user;
   providing the public key of the user to a user terminal of each of a plurality of other users;
   receiving a public key of each of the plurality of other users from the user terminal of each of the plurality of other users;
   generating a common public key using the public key of the user and the public keys of each of the plurality of other users;
   generating a share of each of the user and the plurality of other users for the secret key of the user;
   providing the share of each of the plurality of other users to the user terminal of each of the plurality of other users;
   receiving a share of the user for a secret key of each of the plurality of other users from the user terminal of each of the plurality of other users;
   generating a new secret key of the user using the share of the user for the secret key of the user and the shares of the user for the secret key of each of the plurality of other users; and
   performing distributed decryption based on the new secret key of the user with respect to a ciphertext encrypted using the common public key.

2. The method of claim 1, wherein the generating of the share comprises generating the share of each of the user and the plurality of other users for the secret key of the user such that the secret key of the user is allowed to be generated using a predetermined number or more of shares among the shares of the user and the plurality of other users for the secret key of the user.

3. The method of claim 2, wherein the performing of the distributed decryption comprises:
   generating a partial decryption result using the new secret key of the user with respect to a ciphertext encrypted using the common public key;
   receiving the partial decryption result with respect to the ciphertext generated using an updated secret key share of each of the predetermined number or more of other users from the user terminal of each of the predetermined number or more of other users among the plurality of other users; and
   generating a plaintext for the ciphertext using the generated partial decryption result and the received partial decryption result.

4. The method of claim 3, wherein the generating of the plaintext comprises generating the plaintext through linear combination between the generated partial decryption result and the received partial decryption result.

5. An apparatus for generating a secret key, comprising:
   one or more processors;
   a memory; and
   one or more programs,
   wherein the one or more programs are stored in the memory and configured to be executed by the one or more processors and
   the one or more programs include commands for:
   generating a pair of a public key and a secret key of a user,
   providing the public key of the user to a user terminal of each of a plurality of other users,
   receiving a public key of each of the plurality of other users from the user terminal of each of the plurality of other users,
   generating a common public key using the public key of the user and the public keys of each of the plurality of other users,
   generating a share of each of the user and the plurality of other users for a secret key of the user;
   providing the share of each of the plurality of other users to a user terminal of each of the plurality of other users;
   receiving a share of the user for a secret key of each of the plurality of other users from the user terminal of each of the plurality of other users;
   generating a new secret key of the user using the share of the user for the secret key of the user and the shares of the user for the secret key of each of the plurality of other users; and
   performing distributed decryption based on the new secret key of the user with respect to a ciphertext encrypted using the common public key.

6. The apparatus of claim 5, wherein the generating of the share comprises generating the share of each of the user and the plurality of other users for the secret key of the user such that the secret key of the user is allowed to be generated using a predetermined number or more of shares among the shares of the user and the plurality of other users for the secret key of the user.

7. The apparatus of claim 5, wherein the one or more programs may further include commands for
   generating a partial decryption result using the new secret key of the user with respect to the ciphertext encrypted using the common public key,
   receiving the partial decryption result with respect to the ciphertext generated using an updated secret key share of each of the predetermined number or more of other users from the user terminal of each of the predetermined number or more of other users among the plurality of other users, and
   generating a plaintext for the ciphertext using the generated partial decryption result and the received partial decryption result.

8. The apparatus of claim 7, wherein the generating of the plaintext comprises generating the plaintext through linear combination between the generated partial decryption result and the received partial decryption result.

\* \* \* \* \*